(12) United States Patent
Fowler et al.

(10) Patent No.: US 12,557,938 B2
(45) Date of Patent: Feb. 24, 2026

(54) DRIP COFFEE MAKER WITH TWO DIMENSIONAL BREW SELECTION INTERFACE

(71) Applicant: Midea Group Co., Ltd., Foshan (CN)

(72) Inventors: Simon Fowler, Louisville, KY (US); Daniel J. Trice, Louisville, KY (US)

(73) Assignee: MIDEA GROUP CO., LTD., Foshan (CN)

( * ) Notice: Subject to any disclaimer, the term of this patent is extended or adjusted under 35 U.S.C. 154(b) by 726 days.

(21) Appl. No.: 17/937,255

(22) Filed: Sep. 30, 2022

(65) Prior Publication Data

US 2024/0108163 A1     Apr. 4, 2024

(51) Int. Cl.
*A47J 31/52* (2006.01)

(52) U.S. Cl.
CPC .................................... *A47J 31/521* (2018.08)

(58) Field of Classification Search
CPC ................................ A47J 31/52; A47J 31/521
USPC ........................................................... 99/280
See application file for complete search history.

(56) References Cited

U.S. PATENT DOCUMENTS

| | | | |
|---|---|---|---|
| 8,062,684 B2 | 11/2011 | Gutwein et al. | |
| 8,495,950 B2 | 7/2013 | Fedele | |
| 9,326,634 B1 * | 5/2016 | Fedele | A47J 31/002 |
| 9,499,385 B1 | 11/2016 | Studor | |
| 10,034,486 B2 | 7/2018 | Smits et al. | |
| 10,039,307 B2 | 8/2018 | Wilson et al. | |
| 10,586,417 B2 | 3/2020 | Illy | |
| 10,740,583 B2 | 8/2020 | Noth | |
| 11,129,489 B2 | 9/2021 | Hua | |
| 11,160,419 B2 | 11/2021 | Rose | |
| 2010/0086653 A1 | 4/2010 | Fedele | |

(Continued)

FOREIGN PATENT DOCUMENTS

| | | |
|---|---|---|
| CN | 102151084 B | 8/2011 |
| CN | 112543608 B | 7/2022 |

(Continued)

OTHER PUBLICATIONS

Hi Dolphin, How is AI used in the Coffee Industry?, Retrieved from: https://www.hi-dolphin.com/how-is-ai-used-in-the-coffee-industry/, 3 pages, dated Oct. 18, 2023.

(Continued)

*Primary Examiner* — Stephen F. Gerrity
(74) *Attorney, Agent, or Firm* — Gray Ice Higdon

(57)     ABSTRACT

A two dimensional brew selection interface is used to configure a plurality of brewing parameters used in a drip coffee brewing operation. The two dimensional brew selection interface may include a plurality of positions distributed across first and second dimensions, with each position mapped to a set of values for multiple brewing parameters such that selection of a position in the two dimensional brew selection interface enables the mapped values for the brewing parameters corresponding to the selected position to be used in the drip coffee brewing operation. In some instances, the positions may additionally be mapped to particular flavor attributes, and in some instances, particular taste-like flavor attributes, to further simplify a user's selection of a desired position in the two dimensional brew selection interface.

22 Claims, 7 Drawing Sheets

(56)     References Cited

U.S. PATENT DOCUMENTS

| | | |
|---|---|---|
| 2011/0038998 A1 | 2/2011 | Kohli |
| 2011/0212229 A1* | 9/2011 | McLaughlin et al. ........................ A47J 31/3614 99/283 |
| 2014/0282198 A1* | 9/2014 | Mayworm .......... G06F 3/04847 382/110 |
| 2014/0335463 A1* | 11/2014 | Friedrich et al. ....... A47J 31/52 432/32 |
| 2015/0135962 A1 | 5/2015 | Jarisch |
| 2015/0230655 A1 | 8/2015 | Hoog |
| 2015/0342395 A1 | 12/2015 | Filliol et al. |
| 2015/0351581 A1* | 12/2015 | Li et al. .................. A47J 31/52 700/275 |
| 2015/0359374 A1 | 12/2015 | Anthony |
| 2015/0366234 A1* | 12/2015 | Kuempel et al. ....... A47J 31/52 426/231 |
| 2017/0119195 A1 | 5/2017 | Al-Shaibani |
| 2018/0000108 A1 | 1/2018 | Boggavarapu |
| 2018/0084941 A1 | 3/2018 | Noth |
| 2018/0098658 A1 | 4/2018 | Angell et al. |
| 2019/0307287 A1* | 10/2019 | Magatti ................. A47J 31/521 |
| 2021/0145202 A1 | 5/2021 | Al-shaibani et al. |
| 2021/0235921 A1 | 8/2021 | Kihara |
| 2021/0274958 A1 | 9/2021 | Boone et al. |
| 2021/0307559 A1* | 10/2021 | Kihara et al. ......... A47J 31/521 |
| 2022/0047112 A1 | 2/2022 | Buford |
| 2023/0060264 A1 | 3/2023 | Noth |
| 2023/0284821 A1 | 9/2023 | Xu |
| 2024/0008675 A1 | 1/2024 | Torizu |
| 2024/0099503 A1 | 3/2024 | Loopstra |

FOREIGN PATENT DOCUMENTS

| | | | |
|---|---|---|---|
| DE | 102014011209 A1 | 2/2016 | |
| DE | 202016008296 U1 | 1/2018 | |
| EP | 2279683 B1 | 1/2012 | |
| EP | 2392239 B1 | 3/2015 | |
| EP | 3275346 A1 | 1/2018 | |
| EP | 3827712 A2 | 6/2021 | |
| EP | 3797654 B1 | 12/2021 | |
| EP | 4014799 A1 | 6/2022 | |
| EP | 3225141 B1 | 9/2022 | |
| RU | 2019102423 A | 8/2020 | |
| WO | 0112035 A2 | 2/2001 | |
| WO | 2007027206 A2 | 3/2007 | |
| WO | 2010042455 A1 | 4/2010 | |
| WO | 2019217602 A2 | 11/2019 | |
| WO | 2022020671 A1 | 1/2022 | |

OTHER PUBLICATIONS

Lavrinenko, Vadym, An approach to coffee recommendations according to the history of searches and preferences, ResearchGate, Retrieved from: https://www.researchgate.net/publication/361291090_An_approach_to_coffee_recommendations_according_to_the_history_of_searches_and_preferences, 16 pages, dated Jun. 2022.

Nationwide Coffee, How Artificial Intelligence is Transforming Your Morning Brew, Retrieved from: https://www.nationwidecoffee.co.uk/news/how-artificial-intelligence-is-transforming-your-morning-brew, 4 pages, dated Oct. 24, 2023.

Saeco, Personalized Perfection in Every Brew, Xelsis Suprema, Retrieved from: https://saeco.com/xelsis/xelsis-suprema/; 8 pages, Retrieved on: Dec. 1, 2023.

Beauty-Fashion, Coffee's Digital Barista: Personalized Brewing with AI and Apps, Retrieved from: https://beauty-fashion.mhcase.vn/coffees-digital-barista-personalized-brewing-with-ai-and-apps/, 3 pages, Retrieved on: Dec. 1, 2023.

Cameron, Michael I. et al, Systematically Improving Expresso: Insights from Mathematical Modeling and Experiment, Cell Press, Matter 2, 631-648, dated Mar. 4, 2020.

* cited by examiner

210

Please add

46g (4.5 Tbsp)

of med ground
beans to the
basket

212

Brew

220

Brewing

Custom Brew

222

Pause

230

Brewing Paused

232

Resume

234

Cancel

240

Ready!

242

Rate this brew

244

Save to favorites

Return to menu

246

290
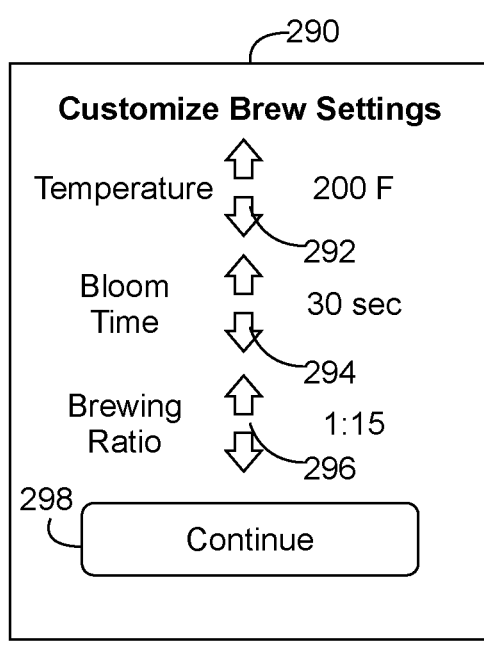
FIG. 16
300
Select an area of the chart to learn about brew selection
Spice
Citrus      Nutty
304
Fruity—Balanced—Cocoa
Honey      Floral
Herbal
302
FIG. 17
314      310
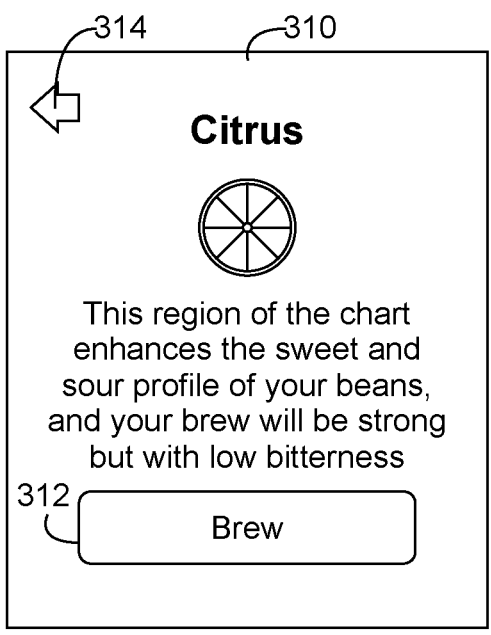
FIG. 18
324      320
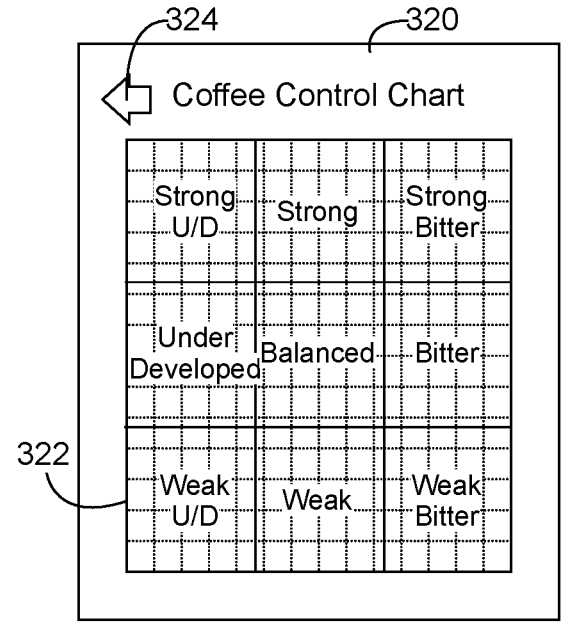
FIG. 19

DRIP COFFEE MAKER WITH TWO DIMENSIONAL BREW SELECTION INTERFACE

BACKGROUND

Coffee is a beverage made from roasted coffee beans, and has long been one of the most popular drinks in the world. Numerous devices and processes for making coffee have been developed, with most incorporating some variation on bringing water into contact with ground coffee beans to extract water soluble components from the ground coffee beans that give coffee its distinctive taste. However, roasted coffee beans can have numerous soluble components that impart different types of flavors that can be pleasing or displeasing to different palates, so variations in brewing processes can significantly impact the flavor of the resulting coffee.

Two primary types of coffee brewing devices in common use today are generally referred to as espresso machines and drip coffee makers. Espresso machines force hot pressurized water relatively quickly through packed and finely ground coffee beans to generate a highly concentrated, but low volume type of coffee generally referred to as espresso. Drip coffee makers, on the other hand, rely primarily on gravity rather than pressure, and drip hot water onto a basket of more coarsely ground coffee beans to allow the water to seep through the coffee grounds to extract the flavor-producing components therefrom. Drip coffee makers also generally incorporate a disposable or reusable filter in the basket such that the coffee grounds are retained in the basket while the coffee is fed by gravity into a cup or larger container disposed below the basket.

Particularly with drip coffee makers, a number of factors can greatly impact a coffee flavor profile, including, for example, the amounts of ground coffee and water that are used, the grind size used to grind the coffee beans, the temperature of the water, and the amount of time the water contacts the ground coffee, among others. While some of these factors, e.g., the grind size and the amount of ground coffee, are often controllable by a consumer, other factors may not be readily controllable. Furthermore, different coffee beans can generate differently-tasting coffees even under identical brewing conditions, and despite industry efforts to characterize a "golden cup" brewing standard, different consumers can still have different taste preferences, so what one consumer considers to be a perfect cup of coffee may differ substantially from the opinions of other consumers.

Efforts have been made to improve the reproducibility of drip coffee makers and thereby minimize the variability of some of the factors that can impact a coffee flavor profile, e.g., by tightly controlling water temperature so that all coffee is brewed at a consistent temperature, so that fewer factors need to be considered when attempting to brew a good tasting coffee. Nonetheless, for many consumers, they are either not sufficiently experienced or not particularly interested in putting in the effort to determine the different brewing parameters needed to brew their own "perfect" cup of coffee. Many consumers value simplicity and speed over taste, and will often reluctantly accept subpar tasting coffee as long as it is quick and easy to brew. On the other hand, this can be to the detriment of the manufacturer of the drip coffee maker, as the consumer may simply blame the product for brewing mediocre coffee, despite the fact that the brewing parameters that were used were not optimal.

Therefore, a significant need exists in the art for a manner of simplifying the configuration of a drip coffee maker to enable consumers to better brew coffee to their own personal liking.

SUMMARY

The herein-described embodiments address these and other problems associated with the art by utilizing a two dimensional brew selection interface to configure a plurality of brewing parameters used in a drip coffee brewing operation. The two dimensional brew selection interface may include a plurality of positions distributed across first and second dimensions, with each position mapped to a set of values for multiple brewing parameters such that selection of a position in the two dimensional brew selection interface enables the mapped values for the brewing parameters corresponding to the selected position to be used in the drip coffee brewing operation. In some instances, the positions may additionally be mapped to particular flavor attributes, and in some instances, particular taste-like flavor attributes, to further simplify a user's selection of a desired position in the two dimensional brew selection interface.

Therefore, consistent with one aspect of the invention, an apparatus is provided including one or more processors and memory operably coupled with the one or more processors, and the memory stores instructions that, in response to execution of the instructions by the one or more processors, cause the one or more processors to configure a drip coffee brewing operation by presenting a two dimensional brew selection interface to a user, the two dimensional brew selection interface including a plurality of positions distributed across first and second dimensions, with each position mapped to a set of values for a plurality of brewing parameters used when performing the drip coffee brewing operation, receiving user input from the user selecting a selected position in the two dimensional brew selection interface, and configuring the plurality of brewing parameters for the drip coffee brewing operation to use the set of values corresponding to the selected position in the two dimensional brew selection interface.

In some embodiments, the apparatus is a mobile computing device, the one or more processors present the two dimensional brew selection interface on and receive the user input from a touch screen display of the mobile computing device, and the one or more processors configure the plurality of brewing parameters for the drip coffee brewing operation by communicating data to a drip coffee maker to cause the drip coffee maker to use the set of values corresponding to the selected position in the two dimensional brew selection interface. Also, in some embodiments, the apparatus is a drip coffee maker including a brew basket, a heating element configured to heat water supplied to the brew basket, and a flow control device configured to control water flow through the brew basket, the one or more processors present the two dimensional brew selection interface on and receive the user input from a touch screen display of the drip coffee maker, and the one or more processors further configure the drip coffee brewing operation by controlling at least one of the heating element and the flow control device during the drip coffee brewing operation based upon at least of the values in the set of values corresponding to the selected position in the two dimensional brew selection interface.

Further, in some embodiments, the plurality of brewing parameters includes a water temperature, a water pressure, a water flow rate, a valve position, a water amount, a coffee amount, a grind size, a bean type, a roast level, a brewing ratio, and/or a water/coffee contact time. In some embodiments, the plurality of brewing parameters includes a coffee amount parameter, and the one or more processors are configured to calculate a value of the coffee amount parameter based at least in part on the selected position in the two dimensional brew selection interface and prompt the user to add an amount of coffee associated with the calculated value of the coffee amount parameter. In addition, in some embodiments, the plurality of brewing parameters includes a coffee amount parameter, and the one or more processors are configured to calculate a value of the coffee amount parameter based at least in part on the selected position in the two dimensional brew selection interface and control a coffee grinder to grind an amount of coffee associated with the calculated value of the coffee amount parameter. In some embodiments, the coffee grinder is an external coffee grinder and the one or more processors are configured to control the coffee grinder by communicating with the coffee grinder over a network.

In addition, in some embodiments, the first dimension corresponds to strength and the second dimension corresponds to development, and the strength is based upon concentration of solubles and the development is based upon yield of solubles. Moreover, in some embodiments, the one or more processors present the two dimensional brew selection interface further by overlaying a plurality of characteristic indicators on the two dimensional brew selection interface, the plurality of characteristic indicators including strong under-developed, strong, strong bitter, under-developed, bitter, weak under-developed, weak, and/or weak bitter indicators.

In some embodiments, the one or more processors present the two dimensional brew selection interface further by overlaying a plurality of flavor attribute indicators on the two dimensional brew selection interface. Moreover, in some embodiments, the plurality of flavor attribute indicators are associated with taste-alike flavor attributes. In some embodiments, the taste-alike flavor attributes include citrus, spice, nutty, fruity, cocoa, floral, herbal, and/or honey.

In addition, in some embodiments, a first flavor attribute indicator of the plurality of flavor attribute indicators is associated with a first position in the two dimensional brew selection interface and the user input selects the first position by selecting the first flavor attribute indicator. In some embodiments, the one or more processors are further configured to display descriptive information about a flavor attribute associated with the first flavor attribute indicator in response to the user input. Moreover, in some embodiments, the user input is first user input, and the one or more processors are further configured to zoom in the two dimensional brew selection interface in response to second user input directed to the two dimensional brew selection interface.

Also, in some embodiments, the user input is first user input, and the one or more processors are further configured to rate the drip coffee brewing operation after completion of the drip coffee brewing operation in response to second user input. In some embodiments, the one or more processors are further configured to display a plurality of rating indicators respectively associated a plurality of prior drip coffee brewing operations in response to third user input. In addition, in some embodiments, each of the prior drip coffee brewing operations is associated with a position in the two dimensional brew selection interface and the one or more processors are configured to display the rating indicators associated with the plurality of prior drip coffee brewing operations by displaying the rating indicator associated with each of the plurality of prior drip coffee brewing operations at a location on a display corresponding to the associated position of such prior drip coffee brewing operation in the two dimensional brew selection interface.

Also, in some embodiments, the one or more processors are further configured to capture a bar code from packaged coffee beans, access a database using an identifier determined from the captured bar code to retrieve data associated with the packaged coffee beans, and configure at least one of the plurality of brewing parameters based at least in part on the retrieved data.

Consistent with another aspect of the invention, a drip coffee maker may include a brew basket, a heating element configured to heat water supplied to the brew basket, a flow control device configured to control water flow through the brew basket, a touchscreen display, and a controller configured to perform a drip coffee brewing operation by presenting a two dimensional brew selection interface on the touchscreen display, the two dimensional brew selection interface including a plurality of positions distributed across first and second dimensions, overlaying a plurality of flavor attribute indicators on the two dimensional brew selection interface, receiving user input from the user selecting a selected position in the two dimensional brew selection interface, and controlling at least one of the heating element and the flow control device during the drip coffee brewing operation based at least in part on the selected position in the two dimensional brew selection interface.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 4-20 are representative user interface displays that may displayed by the drip coffee maker of FIGS. 1-2.

DETAILED DESCRIPTION

Figure 1:
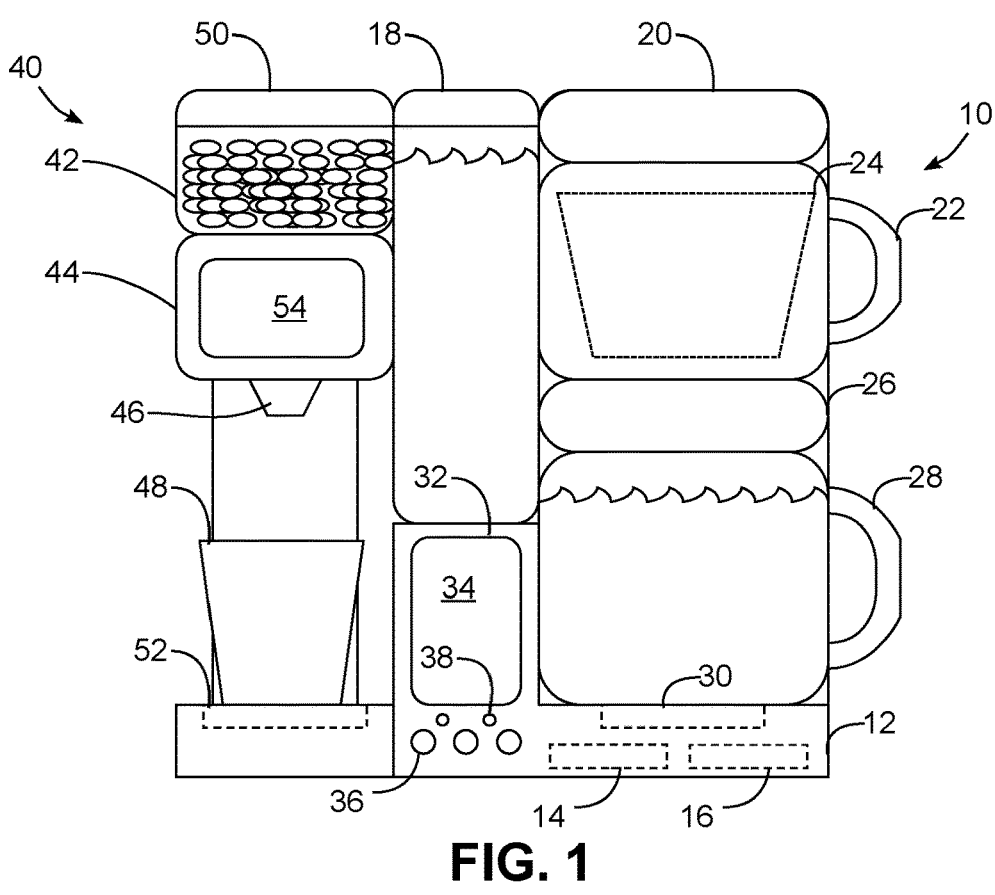
FIG. 1 is a front elevational view of a drip coffee maker consistent with some embodiments of the invention.

Now turning to the drawings, wherein like parts are denoted by like numbers throughout the several views, FIG. 1 illustrates a drip coffee maker 10 consistent with some embodiments of the invention. Drip coffee maker 10 may include a base or housing 12 within which may be included various components utilized in the brewing of coffee, e.g., a heating element 14, and in some instances, a water pump 16, for heating and conveying water from a water reservoir 18 to a water dispenser 20 disposed above a brew basket 22 within which may be disposed a quantity of ground coffee, and in many instances, a disposable or reusable filter. Brew basket 22 in some embodiments may be removable and/or may incorporate a lid or cover providing access to the brew basket 22 when adding ground coffee and a filter prior to brewing and/or when removing the ground coffee and filter after brewing. In some embodiments, a filter support 24 may be used to support a filter, and the coffee grounds contained therein, during a drip coffee brewing operation. Water dispenser 20 in some embodiments may include a shower head or other suitable mechanism for dispensing heated water evenly across the top surface of the ground coffee disposed in brew basket 22 during brewing.

Disposed beneath brew basket 22 is a coffee dispenser 26 that collects the brewed coffee that passes through the filter in brew basket 22 to dispense the brewed coffee into a container via gravity feed, e.g., a carafe 28, which is some instances may be a glass carafe or a thermal carafe, although brewing may be permitted into other types of containers, e.g., mugs or cups. Coffee dispenser 26 may, in some instances, also include an automatic shut-off valve that shuts off dispensing during a brewing operation if the carafe is removed by a consumer. In some instances, a warming element 30 may also be provided in order to maintain a desirable coffee temperature after brewing.

A user interface 32, e.g., including a graphical and/or touchscreen display 34, one or more physical controls 36 (e.g., buttons, knobs, sliders, etc.) and/or one or more indicators 38 (e.g., lights, alphanumeric displays, etc.), may also be disposed on base 12 to enable a user to interact with the drip coffee maker 10.

In some embodiments, a coffee grinder 40 may also be integrated with and/or interfaced with drip coffee maker 10. Coffee grinder 40, for example, may be integrally disposed in base or housing 12 in some embodiments, while in other embodiments, coffee grinder 40 may be removably coupled to or positionable proximate base or housing 12 and interfaced through one or more wires, one or more contacts, or a wireless network to enable commands and/or data to be communicated therebetween. Coffee grinder 40 may also be powered by drip coffee maker 10 or may be separately powered in various embodiments. In still other embodiments, no coffee grinder may be used, or to the extent a consumer grinds coffee for use with drip coffee maker 10, he or she does so using a completely separate coffee grinder.

Coffee grinder 40 may include a bin or hopper 42 positioned over a burr or blade grinding mechanism 44 that outputs ground coffee from a chute 46 into a container 48. Bin or hopper 42 may also include a lid or cover 50 for allowing for external access to add roasted coffee beans to the bin or hopper. Grinding mechanism 44 may be configured to support variable grind sizes in some embodiments, e.g., through manual or electronically-controlled adjustments to the grinding mechanism. In addition, in some embodiments, a scale 52 may be disposed in coffee grinder 40 to measure the weight of the coffee dispensed through chute 46. User interaction with coffee grinder 40 may be provided through a dedicated interface 54 in some embodiments, while in other embodiments, user interface 32 of drip coffee maker 10 may also control coffee grinder 40.

Figure 2:
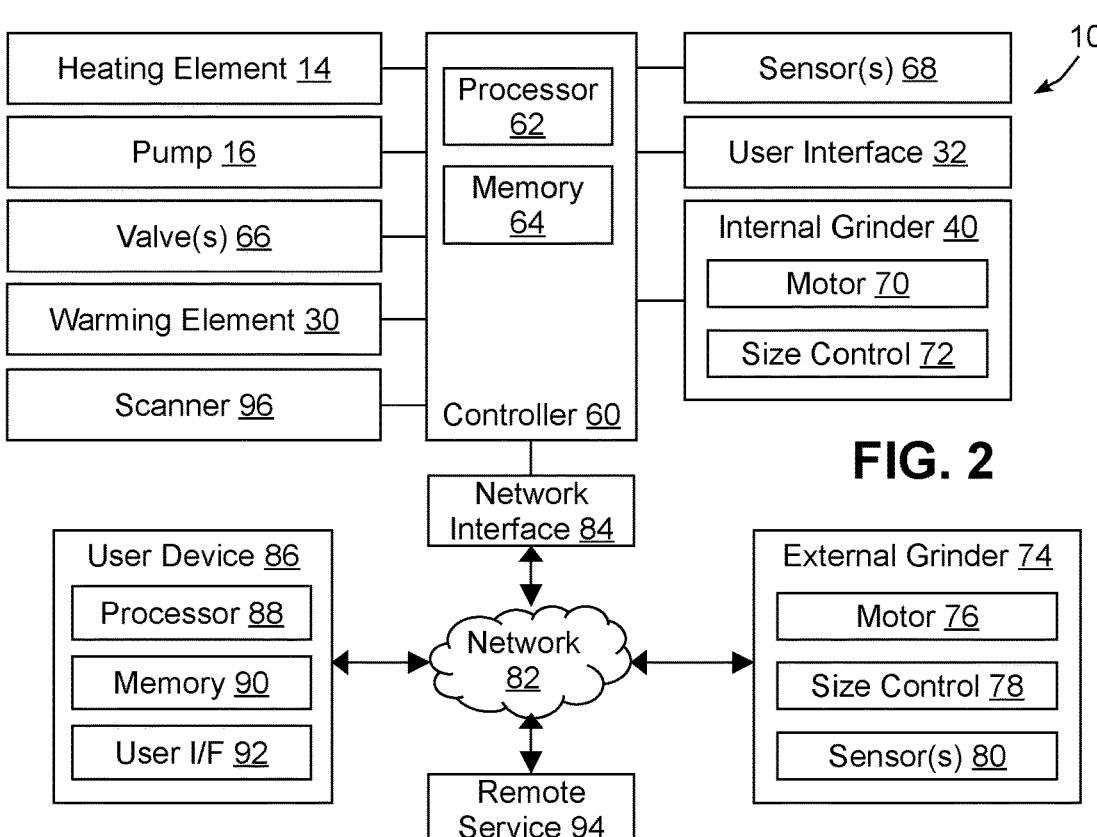
FIG. 2 is a block diagram of an example control system for the drip coffee maker of FIG. 1.

With further reference to FIG. 2, drip coffee maker 10 may be under the control of a controller 60 that receives inputs from a number of components and drives a number of components in response thereto. Controller 60 may, for example, include one or more processors 62 and a memory 64 within which may be stored program code or instructions for execution by the one or more processors 62. The memory may be embedded in controller 60, but may also be considered to include volatile and/or non-volatile memories, cache memories, flash memories, programmable read-only memories, read-only memories, etc., as well as memory storage physically located elsewhere from controller 60, e.g., in a mass storage device or on a remote computer interfaced with controller 60. Controller 60 may also be implemented as a microcontroller in some embodiments, and as such these terms are used interchangeably herein. Controller 60 may also include discrete circuit logic in some embodiments, e.g., including passive and/or active circuit components.

As shown in FIG. 2, controller 60 may be interfaced with various components, including the aforementioned heating element 14, pump 16, warming element 30, user interface 32, and coffee grinder 40, as well as one or more electronically-controlled valves 66 and one or more sensors 68.

In some embodiments, for example, electronically-controlled valves 66 may be disposed upstream and/or downstream of brew basket 22 to effectively control the amount of time that water contacts the ground coffee in the brew basket. An upstream valve 66, for example, may be used to control the flow of heated water into the brew basket 22. A downstream valve 66 may be used to control the flow of coffee out of brew basket 22 into carafe 28 or another container, and in some embodiments, such a valve may also be fully closeable to prevent coffee from dripping from the brew basket whenever carafe 28 is removed. A downstream valve 66 may also, in some embodiments, enable alternate types of brewing processes, e.g., cold brewing processes where unheated water is steeped in coffee grounds for a relatively long duration. While in some embodiments upstream and/or downstream valves 66 may be used, in other embodiments, no electronically-controllable valves may be used and/or one or both of valves 66 may be mechanically controlled. For the purposes of this disclosure, each of pump 16 and valves 66 may be considered to be a flow control device insofar as each may be used in the control of water flow through the brew basket (i.e., either into the brew basket, out of the brew basket, or both).

A wide variety of different types of sensors 68 may also be used, including for example, temperature sensors, fluid pressure sensors, fluid level sensors, flowmeters, presence sensors (e.g., to detect the proper positioning of a carafe, a brew basket, a water reservoir, a grinder hopper, etc.), position sensors, weight sensors, etc. Other sensors that may be suitable in monitoring the status of and otherwise controlling the operation of drip coffee maker 10 will be appreciated by those of ordinary skill having the benefit of the instant disclosure.

As noted above, where coffee grinder 40 is implemented as an internal coffee grinder, controller 60 may be configured to control various components of the coffee grinder directly, e.g., a motor 70 that drives the grinding process (e.g., by rotating one burr cutting element relative to another burr cutting element), and where electronic control of grind size is supported, a size control 72. Size control in other embodiments may be a manual adjustment.

Alternatively, where drip coffee maker 10 is interfaced with an external coffee grinder (e.g., external coffee grinder 74 of FIG. 2, shown including a motor 76, optional size control 78, and one or more sensors 80), controller 60 may communicate with the external coffee grinder over a network 82 through a network interface 84 to instruct the external coffee grinder to grind coffee, e.g., to grind a desired amount (e.g., based on weight or duration) and/or to grind at a specified grind size.

Network interface 84, for example, may represent one or more network interfaces suitable for interfacing with external devices via wired and/or wireless networks such as Ethernet, Bluetooth, NFC, cellular and other suitable networks. It may also be desirable, for example, to interface with one or more user devices 86, e.g., a consumer's mobile phone, which may include one or more processors 88, a memory 90 and a user interface 92) to enable a customer to control drip coffee maker 10 through the user device 86. It may also be desirable to interface with one or more remote services 94, e.g., to obtain firmware updates, to access remote databases with recipes, coffee bean information, to persist user preferences, to provide maintenance or diagnostic functionality, etc. Moreover, in some embodiments, at least a portion of controller 60 may be implemented externally, e.g., within a mobile device, a cloud computing environment, etc., such that at least a portion of the functionality described herein is implemented within the portion of the controller that is externally implemented.

In some embodiments, controller 60 may operate under the control of an operating system and may execute or otherwise rely upon various computer software applications, components, programs, objects, modules, data structures, etc. In addition, controller 60 may also incorporate hardware logic to implement some or all of the functionality disclosed herein. Further, in some embodiments, the operational sequences performed by controller 60 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

It will be appreciated that drip coffee maker 10 may be configured in a wide variety of other manners and may omit one or more of the components discussed above and/or may incorporate other components not explicitly discussed above. For example, as illustrated in FIG. 2, it may be desirable in some embodiments to utilize a bar code or other scanner 96 to enable coffee bean or ground coffee bar codes to be scanned to identify a particular coffee bean or ground coffee being used for a coffee brewing operation and thereby enable the coffee brewing operation to be specifically tailored for a particular coffee bean or ground coffee. Such functionality could also be supported in user device 86, e.g., using a camera of the user device to capture an image of a bar code.

Numerous additional variations and modifications to the drip coffee maker illustrated in FIGS. 1-2 will be apparent to one of ordinary skill in the art, as will become apparent from the description below. Therefore, the invention is not limited to the specific implementations discussed herein.

Two Dimensional Brew Selection Interface

As noted above, in some embodiments, it may be desirable to utilize a two dimensional brew selection interface to facilitate user interaction with a drip coffee maker. It has been found, in particular, that achieving a specific coffee flavor profile is difficult for novice consumers, as well as difficult on most drip coffee makers, which lack an ability to control a number of the brewing parameters that can affect a coffee flavor profile.

Industry groups have attempted to develop standards for coffee flavor profiles, and have developed, for example, a coffee brewing control chart that charts, on one axis, strength, which represents the concentration of solubles in the coffee, and extraction or development, which represents the yield of solubles in the coffee. Strength may be defined in terms of total dissolved solids (TDS), e.g., the percentage (alternatively, the amount) of the end product that includes dissolved solids extracted from the coffee grounds during the brewing process. Extraction or development may be defined in terms of the percentage of the coffee grounds that have been extracted, and thus have moved into the liquid phase. In the standard coffee brewing control chart, strength varies between about 0.80% to 1.60%, and extraction or development varies between about 14% and about 26%. It has also been found that strength and extraction/development are linked by a brewing ratio, representing the ratio of the ground coffee and water used as inputs to the drip coffee brewing process.

An additional characteristic of the coffee brewing control chart is that various characteristics of the end product may be mapped onto the chart, with strength varying between strong and weak, and with extraction or development varying between under-developed, which tends to produce sour or grassy flavors, and bitter. A "golden cup" standard is generally represented at the center of the chart, where a balance exists between both strong and weak and between under-developed and bitter. It has also been found that certain flavor attributes map to different regions of the chart. Moreover, some flavor attributes may represent "taste-alike" attributes, meaning the flavor attributes mimic the flavors of other foods or beverages, e.g., blueberries, citrus fruits, chocolate, vanilla, etc.

Utilizing a coffee brewing control chart, however, is generally beyond the capacity of many novices, and controlling the various brewing parameters that may impact the coffee flavor profile can be difficult and tedious. It has been found, for example, that the water temperature, the brewing ratio (e.g., the ratio of the weight or volume of the ground coffee and the weight or volume of the water), and the water/coffee contact time can have a significant impact on the coffee flavor profile, as can the roast level of the coffee beans (i.e., how long and/or thoroughly the coffee beans have been roasted). Moreover, the grind size of the coffee beans can also affect the coffee flavor profile as finer grinding generally exposes a greater overall surface area to the water, and thus increases extraction rate. In some drip coffee brewing operations, "blooming" may also be performed, where the ground coffee is wetted down at the start of the operation to allow carbon dioxide to be released from the ground coffee in the form of bubbles, rather than being absorbed into the coffee.

It will be appreciated that some of the aforementioned brewing parameters may be directly controllable (e.g., water temperature, grind size), while others may be indirectly controllable (e.g., brewing ratio and water/coffee contact time, and in some instances blooming time). Brewing ratio may be controlled, for example, by controlling the volume or mass of coffee grounds and water used in the operation, while water/coffee contact time and blooming time may be controlled by controlling the rate of water flow into a brew basket, controlling the rate of water flow out of the brew basket, or both.

Additional brewing parameters that may impact a coffee flavor profile, either directly or indirectly, may include, for example, coffee bean type (e.g., brand, model, variety), water pressure, flow rate, and valve position (where a variable valve provides a varying flow rate). The aforementioned list, however, is not exhaustive, and thus other brewing parameters that at least indirectly affect a coffee flavor profile may be used in other embodiments, as will be appreciated by those of ordinary skill having the benefit of the instant disclosure.

Given the numerous and often interconnected brewing parameters that are potentially controllable to control a coffee flavor profile, it would be desirable to provide a simplified manner of controlling these various brewing parameters to facilitate a user's selection of a desired coffee flavor profile. Thus, in the illustrated embodiments, a two dimensional brew selection interface is utilized to provide such a simplified manner of control. Brewing parameters may be effectively abstracted out and generated from one or more transfer functions that map inputs to the two dimensional brew selection interface to sets of values of the controllable brewing parameters utilized in a drip coffee brewing operation.

A two dimensional brew selection interface, in this regard, may generally be considered to be a graphical user interface control having a plurality of selectable positions distributed in two dimensions. In some instances, for example, a two dimensional brew selection interface may be displayed on a touchscreen such that user input directed to the touchscreen selects a particular position in the two dimensional brew selection interface. In other embodiments, however, other control methodologies may be used, e.g., up/down buttons, knobs, joysticks, sliders, point-and-click (e.g., with a mouse), or any other control methodology that allows for selection of a particular position within a two dimensional area.

In some embodiments, a two dimensional brew selection interface includes first and second dimensions that are respectively mapped to strength and extraction/development, as those terms are understood within the context of the coffee brewing control chart. A plurality of positions may be distributed across those dimensions, and each position may be mapped to a set of values for a plurality of brewing parameters used when performing a drip coffee brewing operation. As a result, selection of a selected position within the two dimensional brew selection interface selects a set of values for the brewing parameters that are mapped to that position, such that a drip coffee brewing operation may thereafter be performed using the selected set of values.

Further, in some embodiments, flavor attributes associated with some positions or sets of positions within the two dimensional brew selection interface may be presented to a user in the two dimensional brew selection interface to further assist the user in selecting a desired coffee flavor profile, and in some instances, taste-alike flavor attributes, such as citrus, spice, nutty, fruity, cocoa, honey, herbal, and floral (among others) may be used to identify these flavor attributes. In some embodiments, other information, e.g., the strong/weak and/or under-developed/bitter characteristics mapped to the coffee brewing control chart, may also be presented to a user in the two dimensional brew selection interface to provide the user with another manner of controlling a drip coffee brewing operation. In some embodiments, the mappings between the positions in the two dimensional brew selection interface and the sets of values of the brewing parameters may be determined empirically.

As will also become more apparent below, a two dimensional brew selection interface may also be usable to display a brew history to a user, with prior drip coffee brewing operations displayed on the two dimensional brew selection interface at locations corresponding to the selected positions used in those operations. In addition, a user may be permitted to rate each drip coffee brewing operation, and have that rating presented on the two dimensional brew selection interface. By doing so, a user may be able to iteratively try different positions, rate the results, and eventually settle on a position that he or she is happy with for future drip coffee brewing operations. Further, in some embodiments, specific positions may be saved as favorites, thereby facilitating recall for future drip coffee brewing operations.

Figure 3:
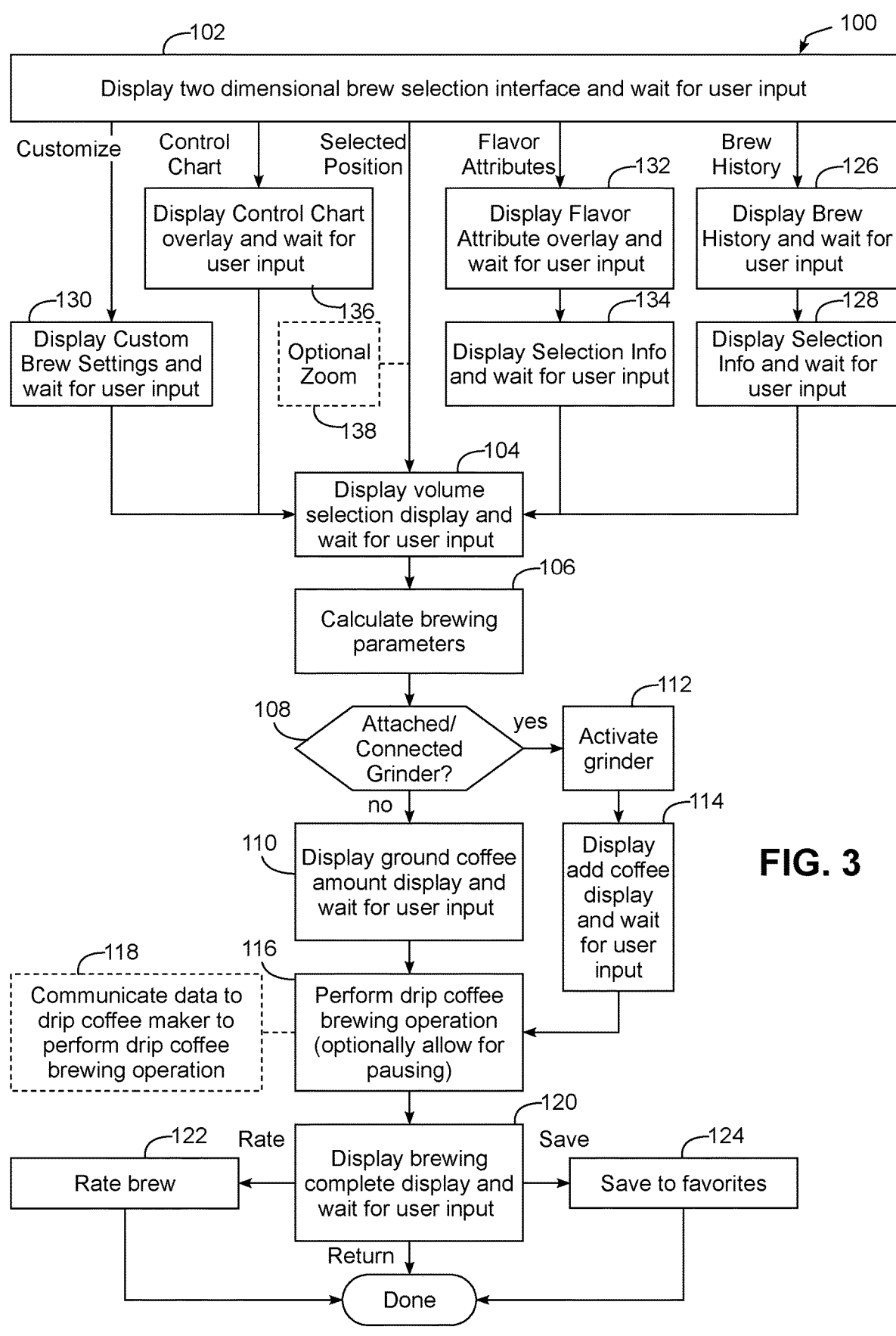
FIG. 3 is a flowchart illustrating an example operational sequence for controlling the drip coffee maker of FIGS. 1 and 2 using a two dimensional brew selection interface.

Now turning to FIG. 3, and with additional reference to FIGS. 4-20, an example operational sequence for controlling a drip coffee brewing operation using a two dimensional brew selection interface is illustrated at 100. Operational sequence 100 may be executed, for example, by one or more processors in drip coffee maker 10 of FIGS. 1-2, or alternatively, at least some of the operations in operational sequence 100 may be executed by one or more processors of a user device in communication with drip coffee maker 10, e.g., user device 86 of FIG. 2. It is assumed for the purposes of this example that the two dimensional brew selection interface is displayed on a touchscreen display (either on the drip coffee maker or on the user device), whereby a user may select a position on the two dimensional brew selection interface by touching the touchscreen display at an appropriate position. With other user interfaces and controls, however, other types of user interaction may be used, so the invention is not limited to the touchscreen-based interaction described herein.

Figure 4:
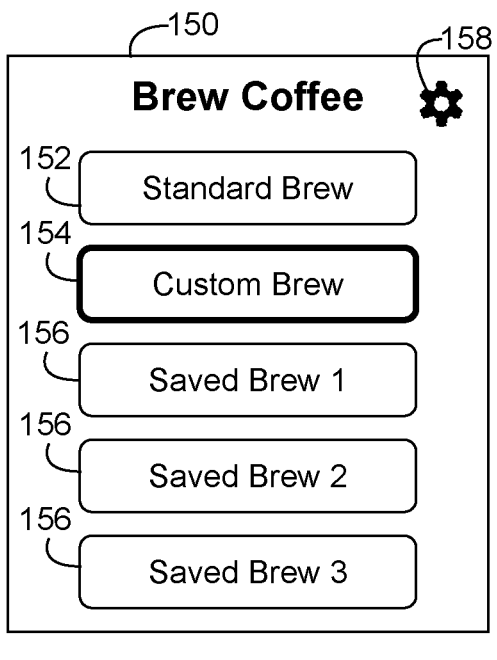

With initial reference to FIG. 4, a home display 150 may initially be displayed to a user, and may include controls used for selecting a standard drip coffee brew operation (control 152), a custom drip coffee brew operation (control 154) or a saved drip coffee brew operation (controls 156). Additional functions, such as changing settings, configuring the drip coffee maker, etc., may be accessed through a settings control 158. Assuming, for example, a user selects control 154 to request a custom drip coffee brew operation, block 102 of FIG. 3 may display a two dimensional brew selection interface to the user and wait for user input.

Figure 5:
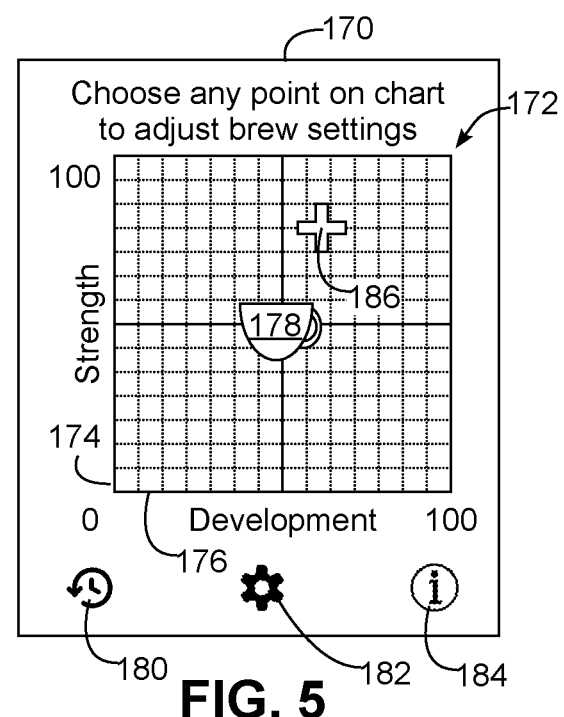

FIG. 5, for example, illustrates a custom brew display 170 that includes an example implementation of a two dimensional brew selection interface 172 consistent with some embodiments of the invention. Interface 172 includes a vertical strength axis or dimension 174 and a horizontal development or extraction axis or dimension 176, and in some embodiments, these dimensions 174, 176 may generally correspond to the strength and development/extraction axes of the standard coffee brewing control chart. However, rather than utilizing the ranges of percentages corresponding to those in the coffee brewing control chart, it may be desirable to use other ranges and/or units. In the illustrated embodiment, for example, the dimensions are unitless and span ranges of 0-100, thereby providing a 100×100 two dimensional array of selectable positions. It will be appreciated that finer or coarser resolution may be used in other embodiments (e.g., a 10×10 array may be sufficient in some embodiments), and that various other units may also be used. The "golden cup" position of the coffee brewing control chart may also optionally be represented by an icon or indicator 178 in some embodiments.

Display 170 may include additional controls, including a brew history control 180, a customize control 182 and an info control 184, the operation of which will be discussed in greater detail below.

Figure 6:
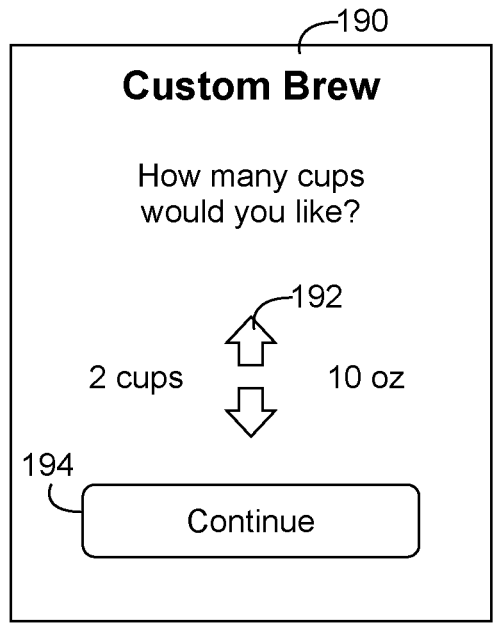
Figure 6:

For the purposes of this example, assume that upon being presented with display 170, a user selection the position represented at 186. Returning to FIG. 3, such a selection passes control to block 104 to display a volume selection display and wait for further user input. FIG. 6, for example, illustrates a volume selection display 190 that queries the user for the number of cups, or the total volume (e.g., in ounces), he or she wishes to brew. A set of up/down controls 192, for example, may be used to make the desired volume selection, and a user may select a continue control 194 when the desired volume has been selected.

Figure 7:
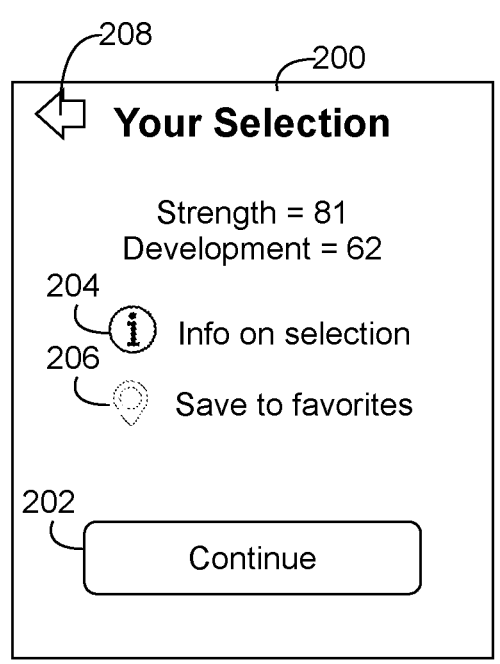

In some embodiments, prior to presenting a user with display 170, the intermediate display 200 of FIG. 7 may be presented, providing the user with information about the selected position (here, a strength of 81 and a development/ extraction of 62), a continue control 202 to proceed to display 190, as well as additional user controls, e.g., a control 204 to provide additional information about the selection, a control 206 to save the selection as a favorite, and a back control 208 to enable the user to go back to display 170 to re-select a position.

Returning again to FIG. 3, once the user has made a volume selection, control passes from block 104 to block 106 to calculate the brewing parameters to be used for the drip coffee brewing operation. The brewing parameters may be based, in part, on the selected position in the two dimensional brew selection interface, e.g., using a set of values for the brewing parameters that are mapped to the selected position. The brewing parameters may be scaled, for example, based upon the selected volume, e.g., to determine a suitable volume or weight of coffee grounds necessary to provide a desired brewing ratio based upon the volume selected by the user. In some embodiments, for example, the primary brewing parameters may include water temperature, brewing ratio, water/coffee contact time, and bloom time, and as a result of these primary brewing parameters, various secondary brewing parameters may be calculated, e.g., flow rates, valve positions, etc. suitable for providing the desired water/coffee contact time, as well as the volume or weight of coffee grounds matching the selected brewing ratio and given the volume of water selected by the user. These brewing parameters, however, are not exclusive, so the invention is not limited to this specific combination of brewing parameters.

Figure 8:
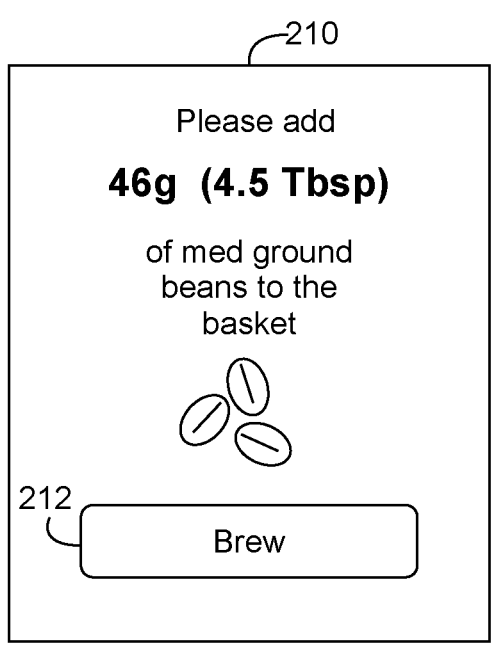
Figure 9:
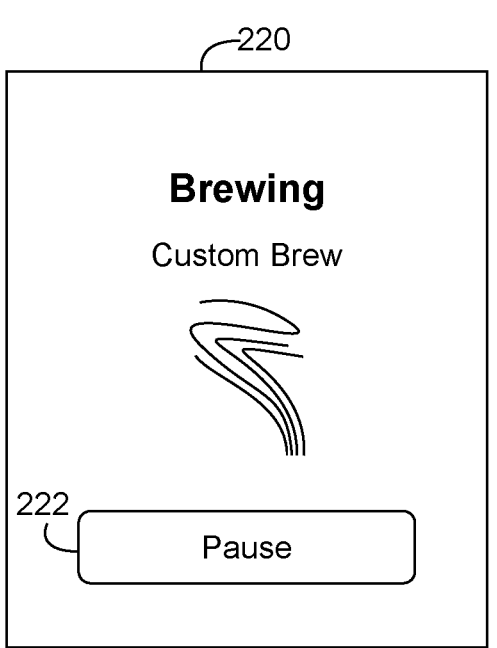
Figure 10:
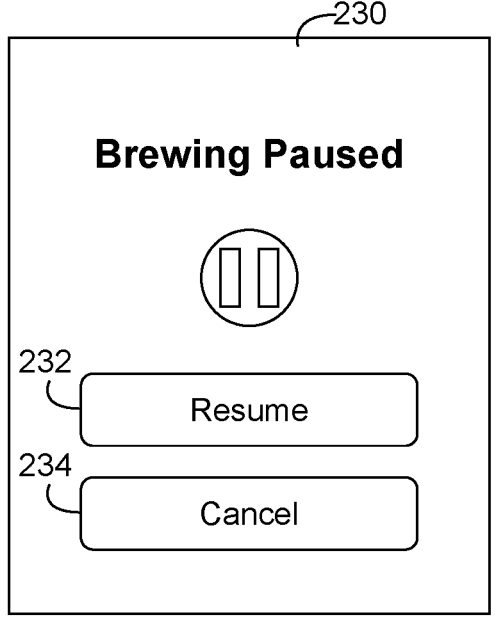

Once the brewing parameters have been calculated, control passes to block 108 to determine whether a grinder is attached to or otherwise connected to the drip coffee maker. If not, the user may be prompted to add the proper amount of coffee grounds (either pre-ground, or ground by an independent coffee grinder) to the brew basket (block 110). FIG. 8, for example, illustrates a ground coffee amount display 210 that may be displayed in some embodiments, providing the user with the specific amount of coffee grounds to add to the brew basket, as well as providing a brew control 212 that may be selected once the coffee grounds have been added and the drip coffee brewing operation is ready to be performed.

Returning to FIG. 3, and specifically to block 108, if there is a controllable grinder in communication with the drip coffee maker, control passes to block 112 to activate the grinder to grind the determined amount of coffee grounds. Grinding may occur at a fixed grind size, or if grind size is a controlled brewing parameter, the grinder may be configured to operate at the desired grind size. The amount of coffee grounds may be controlled by controlling a duration of operation of the grinder, or alternatively, based upon weight, e.g., as sensed by scale 52 of FIG. 1. Thereafter, in block 114, an add coffee display may be displayed to the user, prompting the user to add the coffee ground by the grinder to the brew basket and select a brew control to continue. In some embodiments, a display similar to display 210 of FIG. 8 may also be displayed in block 114, potentially omitting the volume of coffee grounds to be added, given that the grinder has already ground the desired amount.

Upon selection of a brew control in either block 110 or block 114, control then passes to block 116 to perform the drip coffee brewing operation using the calculated values for the brewing parameters. In some embodiments, a display such as display 220 of FIG. 9 may be displayed during the operation. In addition, in some embodiments it may be desirable to allow for an operation to be paused (e.g., by selecting control 222), which may result in the operation being paused and a display such as display 230 of FIG. 10 being presented to the user. At that time, a user may be able to resume the operation by selecting control 232, or alternatively cancel the operation by selecting control 234.

As noted above, in some embodiments at least a portion of operational sequence 100 may be performed on a user device. As such, and as represented in block 118 of FIG. 3, if the operations performed in blocks 100-114 are performed in a user device, rather than performing the drip coffee brewing operation in block 116, a user device may instead communicate data to a drip coffee maker in block 118 to cause that drip coffee maker to perform the drip coffee brewing operation. The data communicated may include, for example, the calculated values for the brewing parameters, or other data that enables a drip coffee maker to calculate the values itself.

Figure 11:
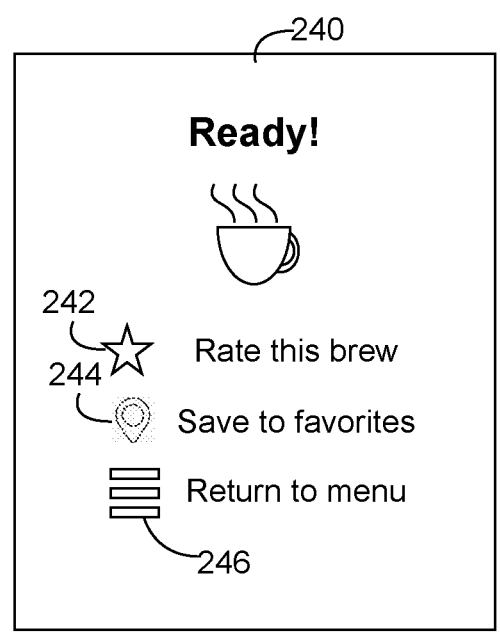

Regardless of whether the operational sequence is performed by the drip coffee maker or a user device, once the drip coffee brewing operation is complete, either of block 116 or block 118 passes control to block 120 to display a brewing complete display and wait for user input. FIG. 11, for example, illustrates one suitable brewing complete display 240, which indicates that the coffee is ready and provides a number of controls that are selectable by a user. A rate this brew control 242, for example, may be used to rate the coffee that was just brewed, e.g., as represented by block 122 of FIG. 3. A save to favorites control 244, for example, may be used to save the coffee that was just brewed as a favorite (e.g., based upon the selected position in the two dimensional brew selection interface), e.g., as represented by block 124 of FIG. 3. A return to menu control 246 may be used to return to main display 150 of FIG. 4.

Figure 12:

FIG. 12 illustrates an example rate display 250 that may be presented to a user when rating the coffee in block 122 of FIG. 3. A user may be presented with a control 252 suitable for rating the coffee, e.g., with 0 to 5 stars, or using other denominations. A return to menu control 254 may also be provided to return to main display 150 of FIG. 4. When rating the coffee, the rating may be stored along with additional information, e.g., the selected position (e.g., the strength and development values), a timestamp, other brewing parameters (e.g., the selected volume), etc. As discussed below, this information may later be used to provide a user with historical brew information.

Figure 13:
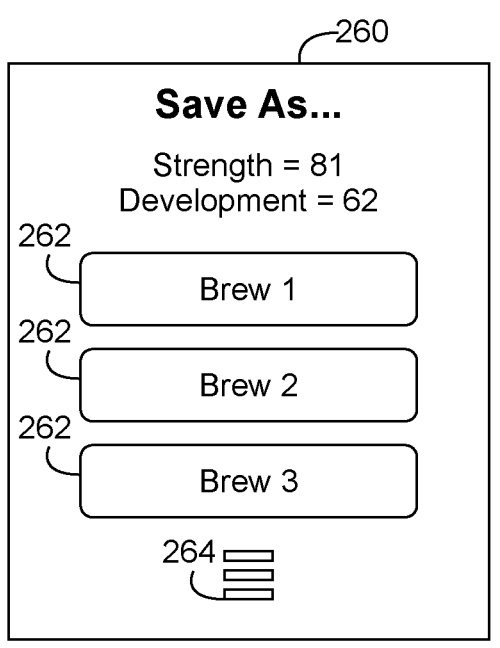

FIG. 13 illustrates an example save to favorites display 260 that may be presented to a user when saving the coffee as a favorite in block 124 of FIG. 3. A user may be presented with a set of controls 262 that may be overwritten with the current coffee (e.g., the selected position). A return to menu control 264 may also be provided to return to main display 150 of FIG. 4. Saving the coffee as a favorite enables a user to brew using the same brewing parameters when selecting the appropriate control 156 in main display 150.

Figure 14:
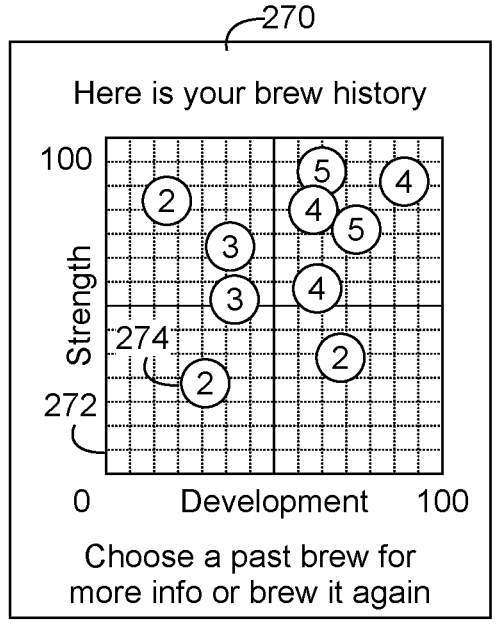

Returning to FIG. 3, and specifically to block 100, selection of control 180 in display 170 of FIG. 5 may result in the display of a user's brew history. While brew history may be displayed in a number of manners in other embodiments, in the illustrated embodiment, a display such as display 270 of FIG. 14 is displayed, including a two dimensional brew selection interface 272 overlaid with icons or indicators 274 corresponding to the positions of prior drip coffee brewing operations, i.e., such that the location of each icon or indicator in display 270 generally corresponds to the associated position of the prior drip coffee brewing operation in the two dimensional brew selection interface. The position of each icon or indicator 274 may be based upon the selected position that was used to configure the drip coffee brewing operation, and moreover, it may be desirable to display each icon or indicator 274 as a rating indicator that represents the user's rating of the corresponding drip coffee brewing operation, e.g., using a number corresponding to the number of stars, a numerical rating, a color, a pattern, etc. It will be appreciated that by displaying the brew history in this manner, a user is able to visualize where in the two dimensional brew selection interface the user has brewed coffee, and where the results have been better or worse. In addition, a user is given guidance as to possible positions to select in the future if he or she wants to continue to improve the coffee flavor profile. In FIG. 14, for example, two prior operations have been rated with 5 stars, so a user may wish to select a different position in close proximity to those prior operations (perhaps at a midpoint between those operations) to see if he or she likes the results better than past operations.

Figure 15:

In addition, each icon or indicator 274 is selectable by a user to obtain additional information about the corresponding drip coffee brewing operation and/or to potentially use the same brewing parameters to brew additional coffee. Thus, as illustrated in block 128 of FIG. 3, upon selection of an icon or indicator, information about the selection may be displayed and additional user input may be received. FIG. 15, for example, illustrates a suitable display 280 for displaying additional information about a prior drip coffee brewing operation, including, for example, the selected position (strength and development values) and the rating. At this time, the user may have the option of brewing additional coffee using the same brewing parameters (control 282) or saving to favorites (control 284). Returning again to FIG. 3, if the user does wish to brew additional coffee, block 128 may pass control to block 104 to proceed with the drip coffee brewing operation using the same brewing parameters.

Returning again to FIG. 3, and specifically to block 100, selection of control 182 in display 170 of FIG. 5 may result in the display of custom brew settings in block 130. FIG. 16, for example, illustrates an example display 290 within which are disclosed various configurable brewing parameters, here water temperature (controllable using up/down arrow controls 292), bloom time (controllable using up/down arrow controls 294) and brewing ratio (controllable using up/down arrow controls 296). Thus, display 290 may be suitable for users with a desire for more granular control over a drip coffee brewing operation. After configuring the brewing parameters, selection of continue control 298 may initiate a drip coffee brewing operation, with block 130 of FIG. 3 passing control to block 104 to proceed with the drip coffee brewing operation using the selected brewing parameters.

Returning again to FIG. 3, and specifically to block 100, selection of control 184 in display 170 of FIG. 5 may result in the display of a flavor attribute overlay onto a two dimensional brew selection interface (block 132). FIG. 17, for example, illustrates an example display 300 within which is displayed a two dimensional brew selection interface 302 along with various flavor attribute labels or indicators 304 corresponding to various flavor attributes and positioned generally in regions of the coffee brewing control chart that are associated with such flavor attributes. In some embodiments, each label or indicator 304 may be selectable and may be mapped to a specific position in the two dimensional brew selection interface 302 such that selection of any portion of the label or indicator will result in selection of the same position, despite the fact that the actual position selected is offset from that mapped to the label or indicator. In other embodiments, however, the labels or indicators may merely be informational, and selection of a position in the two dimensional brew selection interface may be independent of any label or indicator. In display 300, labels or indicators 304 are provided for various taste-alike flavor attributes, including citrus, spice, nutty, fruity, cocoa, floral, herbal, and honey, along with an additional label or indicator for "balanced", representing the center point or golden cup standard for the two dimensional brew selection interface.

In the illustrated embodiment, selection of a label or indicator 304 from display 300 causes the display of a selection information display providing descriptive information about the flavor attribute, e.g., as illustrated in block 134 of FIG. 3. FIG. 18 illustrates an example display 310 for the "citrus" flavor attribute, which displays information about the flavor attribute ("this region of the chart enhances the sweet and sour profile of your beans, and your brew will be strong but with low bitterness"). A brew control 312 may be provided to proceed with a drip coffee brewing operation using the selected position corresponding to the selected flavor attribute (whereby control passes from block 134 to block 104 of FIG. 3). A back control 314 may return to display 300 of FIG. 17 to allow for further perusing by the user.

Returning again to FIG. 3, and specifically to block 100, it may also be desirable to provide a user with a control chart overlay when desired, e.g., to display additional details about the coffee brewing control chart upon which the two dimensional brew selection interface is based (block 136). FIG. 19, for example, illustrates an example display 320 within which is displayed a two dimensional brew selection interface 322 along with an overlay of characteristic labels or indicators corresponding to the different regions of the coffee brewing control chart, e.g., strong under-developed, strong, strong bitter, under-developed, balanced, bitter, weak under-developed, weak, and weak bitter. A user may be able to select a position in interface 322 and proceed with a drip coffee brewing operation in a similar manner to that discussed above (by passing control from block 136 to block 104 in FIG. 3). In addition, a back control 324 may return to display 170 of FIG. 5.

Figure 20:
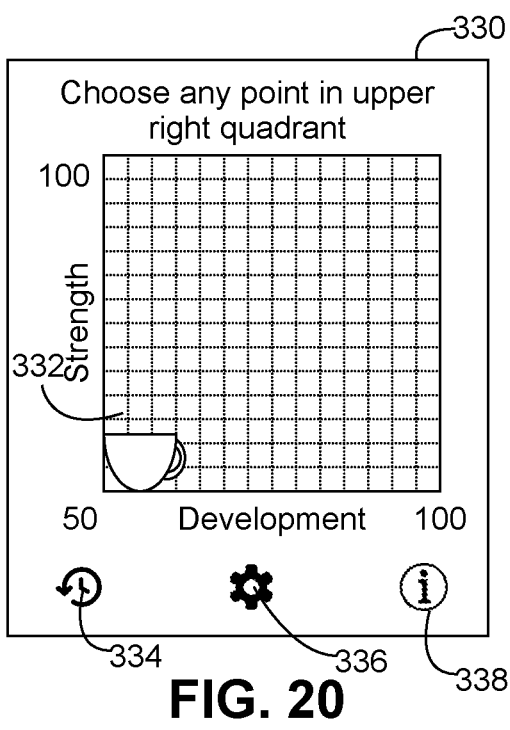

Returning again to FIG. 3, and specifically block 138, it may also be desirable in some embodiments, particularly with smaller touchscreen displays, to allow for a user to zoom in on a portion of a two dimensional brew selection interface before selecting a position in the interface. Thus, rather than selecting a position in one action, a user may first select one region (e.g., one quadrant) of the interface to cause that region (e.g., quadrant) of the interface to be zoomed in, thereby allowing the user to select a specific position with greater precision. FIG. 20, for example, illustrates a display 330 that may be displayed in some embodiments after a user initially selects the upper right quadrant of two dimensional brew selection interface 170 of FIG. 5, where a quadrant 332 of the two dimensional brew selection interface has been displayed, and a user is able to select a position within that quadrant. Additional functions, e.g., viewing brew history (control 334), customizing brewing parameters (control 336) and displaying further information (control 338) may still be supported.

Figure 21:
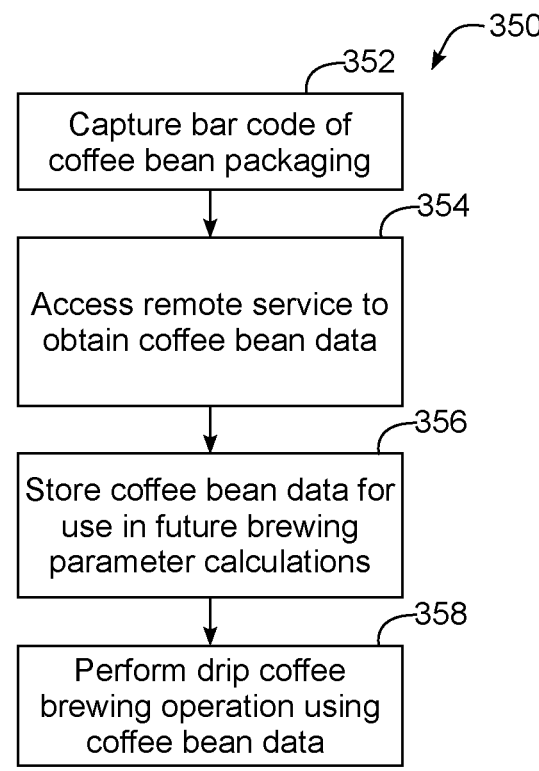
FIG. 21 is a flowchart illustrating an example operational sequence for controlling the drip coffee maker of FIGS. 1 and 2 using a scanned barcode from coffee bean packaging.

Now turning to FIG. 21, as noted above, it may also be desirable to configure a drip coffee brewing operation at least in part based upon the type of coffee beans being used in the operation. While various alternative manners of obtaining information about the type of beans being used may be used, in some embodiments a bar code on the packaging used for the coffee beans may be used to access a remote or local database for use in configuring one or more brewing parameters for a drip coffee brewing operation. FIG. 21 in particular illustrates an operational sequence 350 that begins in block 352 by capturing a bar code of the packaged coffee beans. The bar code may be captured, for example, using scanner 96 of FIG. 2, or alternatively, by a camera of a user device. Once the bar code is scanned, and a SKU or other product identifier is determined, a remote service may be accessed (block 354) to obtain data associated with the coffee beans. The data may include information such as roast level, variety, brand, model, etc., or may include one or more brewing parameters to be used when brewing with the beans, scaling factors that may be used based upon properties of the beans, suggested grind sizes, or even specific brewing recipes, e.g., as created by producers or third parties. The data may be stored for future use (block 356) and then at a later point, one or more drip coffee brewing operations may be performed using the stored coffee bean data (block 358).

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. An apparatus comprising one or more processors and memory operably coupled with the one or more processors, wherein the memory stores instructions that, in response to execution of the instructions by the one or more processors, cause the one or more processors to configure a coffee brewing operation by:

presenting a two dimensional brew selection interface to a user, the two dimensional brew selection interface including a plurality of positions distributed across first and second dimensions, with each position mapped to a set of values for a plurality of brewing parameters used when performing the coffee brewing operation;

overlaying a plurality of flavor attribute indicators on the two dimensional brew selection interface, wherein the plurality of flavor attribute indicators are associated with taste-alike flavor attributes;

receiving user input from the user selecting a selected position in the two dimensional brew selection interface; and configuring the plurality of brewing parameters for the coffee brewing operation to use the set of values corresponding to the selected position in the two dimensional brew selection interface.

2. The apparatus of claim 1, wherein the apparatus is a mobile computing device, the one or more processors present the two dimensional brew selection interface on and receive the user input from a touch screen display of the mobile computing device, and the one or more processors configure the plurality of brewing parameters for the coffee brewing operation by communicating data to a coffee maker to cause the coffee maker to use the set of values corresponding to the selected position in the two dimensional brew selection interface.

3. The apparatus of claim 1, wherein the apparatus is a coffee maker including a brew basket, a heating element configured to heat water supplied to the brew basket, and a flow control device configured to control water flow through the brew basket, the one or more processors present the two dimensional brew selection interface on and receive the user input from a touch screen display of the coffee maker, and the one or more processors further configure the drip coffee brewing operation by controlling at least one of the heating element and the flow control device during the coffee brewing operation based upon at least of the values in the set of values corresponding to the selected position in the two dimensional brew selection interface.

4. The apparatus of claim 1, wherein the plurality of brewing parameters includes a water temperature, a water pressure, a water flow rate, a valve position, a water amount, a coffee amount, a grind size, a bean type, a roast level, a brewing ratio, and/or a water/coffee contact time.

5. The apparatus of claim 1, wherein the plurality of brewing parameters includes a coffee amount parameter, and the one or more processors are configured to calculate a value of the coffee amount parameter based at least in part on the selected position in the two dimensional brew selection interface and prompt the user to add an amount of coffee associated with the calculated value of the coffee amount parameter.

6. The apparatus of claim 1, wherein the plurality of brewing parameters includes a coffee amount parameter, and the one or more processors are configured to calculate a value of the coffee amount parameter based at least in part on the selected position in the two dimensional brew selection interface and control a coffee grinder to grind an amount of coffee associated with the calculated value of the coffee amount parameter.

7. The apparatus of claim 6, wherein the coffee grinder is an external coffee grinder and the one or more processors are configured to control the coffee grinder by communicating with the coffee grinder over a network.

8. The apparatus of claim 1, wherein the first dimension corresponds to strength and the second dimension corresponds to development, and the strength is based upon concentration of solubles and the development is based upon yield of solubles.

9. The apparatus of claim 8, wherein the one or more processors present the two dimensional brew selection interface further by overlaying a plurality of characteristic indicators on the two dimensional brew selection interface, the plurality of characteristic indicators including strong underdeveloped, strong, strong bitter, under-developed, bitter, weak under-developed, weak, and/or weak bitter indicators.

10. The apparatus of claim 1, wherein the user input is first user input, and wherein the one or more processors selectively overlay the plurality of flavor attribute indicators on the two dimensional brew selection interface in response to second user input.

11. The apparatus of claim 10, wherein the one or more processors selectively hide the plurality of flavor attribute indicators in response to third user input.

12. The apparatus of claim 1, wherein the taste-alike flavor attributes include citrus, spice, nutty, fruity, cocoa, floral, herbal, and/or honey, and each of the plurality of flavor indicators identifies a taste-alike flavor attribute from among the citrus, spice, nutty, fruity, cocoa, floral, herbal, and/or honey taste-alike flavor attributes.

13. The apparatus of claim 1, wherein a first flavor attribute indicator of the plurality of flavor attribute indicators is associated with a first position in the two dimensional brew selection interface and the user input selects the first position by selecting the first flavor attribute indicator.

14. The apparatus of claim 13, wherein the one or more processors are further configured to display descriptive information about a flavor attribute associated with the first flavor attribute indicator in response to the user input.

15. The apparatus of claim 1, wherein the user input is first user input, and the one or more processors are further configured to zoom in the two dimensional brew selection interface in response to second user input directed to the two dimensional brew selection interface.

16. The apparatus of claim 1, wherein the one or more processors are further configured to:

capture a bar code from packaged coffee beans;

access a database using an identifier determined from the captured bar code to retrieve data associated with the packaged coffee beans; and configure at least one of the plurality of brewing parameters based at least in part on the retrieved data.

17. The method of claim 1, wherein the coffee brewing operation is a drip coffee brewing operation.

18. An apparatus comprising one or more processors and memory operably coupled with the one or more processors, wherein the memory stores instructions that, in response to execution of the instructions by the one or more processors, cause the one or more processors to configure a coffee brewing operation by:

presenting a two dimensional brew selection interface to a user, the two dimensional brew selection interface including a plurality of positions distributed across first and second dimensions, with each position mapped to a set of values for a plurality of brewing parameters used when performing the coffee brewing operation;

receiving user input from the user selecting a selected position in the two dimensional brew selection interface; and configuring the plurality of brewing parameters for the coffee brewing operation to use the set of values corresponding to the selected position in the two dimensional brew selection interface;

wherein the user input is first user input, and the one or more processors are further configured to rate the coffee brewing operation after completion of the coffee brewing operation in response to second user input, wherein the one or more processors are further configured to display a plurality of rating indicators respectively associated with a plurality of prior coffee brewing operations in response to third user input, and wherein each of the prior coffee brewing operations is associated with a position in the two dimensional brew selection interface and the one or more processors are configured to display the rating indicators associated with the plurality of prior coffee brewing operations by displaying the rating indicator associated with each of the plurality of prior coffee brewing operations at a location on a display corresponding to the associated position of such prior coffee brewing operation in the two dimensional brew selection interface.

19. A coffee maker, comprising:

a brew basket;

a heating element configured to heat water supplied to the brew basket;

a flow control device configured to control water flow through the brew basket;

a touchscreen display; and a controller configured to perform a coffee brewing operation by:

presenting a two dimensional brew selection interface on the touchscreen display, the two dimensional brew selection interface including a plurality of positions distributed across first and second dimensions;

overlaying a plurality of flavor attribute indicators on the two dimensional brew selection interface;

receiving user input from the user selecting a selected position in the two dimensional brew selection interface; and controlling at least one of the heating element and the flow control device during the coffee brewing operation based at least in part on the selected position in the two dimensional brew selection interface.

20. The coffee maker of claim 19, wherein the coffee brewing operation is a drip coffee brewing operation.

21. An apparatus comprising one or more processors and memory operably coupled with the one or more processors, wherein the memory stores instructions that, in response to execution of the instructions by the one or more processors, cause the one or more processors to configure a coffee brewing operation by:

presenting a two dimensional brew selection interface to a user, the two dimensional brew selection interface including a plurality of positions distributed across first and second dimensions, with each position mapped to a set of values for a plurality of brewing parameters used when performing the coffee brewing operation;

displaying on the two dimensional brew selection interface a plurality of indicators having respective locations on the two dimensional brew selection interface corresponding to respective selected positions of respective prior coffee brewing operations;

receiving user input from the user selecting a selected position in the two dimensional brew selection interface; and configuring the plurality of brewing parameters for the coffee brewing operation to use the set of values corresponding to the selected position in the two dimensional brew selection interface.

22. The apparatus of claim 21, wherein the user input is first user input, the one or more processors are further configured to rate the coffee brewing operation after completion of the coffee brewing operation in response to second user input, and the plurality of indicators are rating indicators that indicate user-selected ratings of the prior coffee brewing operations.

\* \* \* \* \*